United States Patent [19]
Vivier

[11] Patent Number: 5,758,603
[45] Date of Patent: Jun. 2, 1998

[54] APPLICATION OF A PESTICIDE TO AN ANIMAL

[76] Inventor: Jacobus Lodewickus Vivier, Pienaar Street, Verkeerdevlei, South Africa

[21] Appl. No.: 306,169

[22] Filed: Sep. 14, 1994

[30] Foreign Application Priority Data

Sep. 21, 1993 [ZA] South Africa .......................... 93/6974

[51] Int. Cl.$^6$ .................................................. A01K 29/00
[52] U.S. Cl. ................................................... 119/669
[58] Field of Search ........................... 119/156, 159, 119/160, 650, 665, 667, 669

[56] References Cited

U.S. PATENT DOCUMENTS

| 4,126,104 | 11/1978 | Overby | 119/159 |
| 4,987,861 | 1/1991 | Lemire et al. | 119/159 |
| 5,063,880 | 11/1991 | Bouthillier | 119/159 |

FOREIGN PATENT DOCUMENTS

| 1287874 | 2/1987 | U.S.S.R. | 119/159 |
| 1629051 | 2/1991 | U.S.S.R. | 119/159 |
| 2063637 | 6/1981 | United Kingdom | 119/159 |
| 2106364 | 4/1983 | United Kingdom | 119/159 |

*Primary Examiner*—Thomas Price
*Attorney, Agent, or Firm*—Ladas & Parry

[57] ABSTRACT

An apparatus for applying a pesticide to an animal includes a light beam emitter and detector arrangement for detecting the presence of the animal within an application zone. The arrangement is capable of generating a suitable signal upon detecting the animal. A plurality of nozzles for applying pesticide to the animal are provided. The nozzles are actuable upon receipt of the signal from the arrangment. The nozzles are suitably oriented with respect to the application zone so that the pesticide is applied to desired regions of the animal, the regions including a region between front legs of the animal. The invention extends to a method for applying a pesticide to an animal.

21 Claims, 5 Drawing Sheets

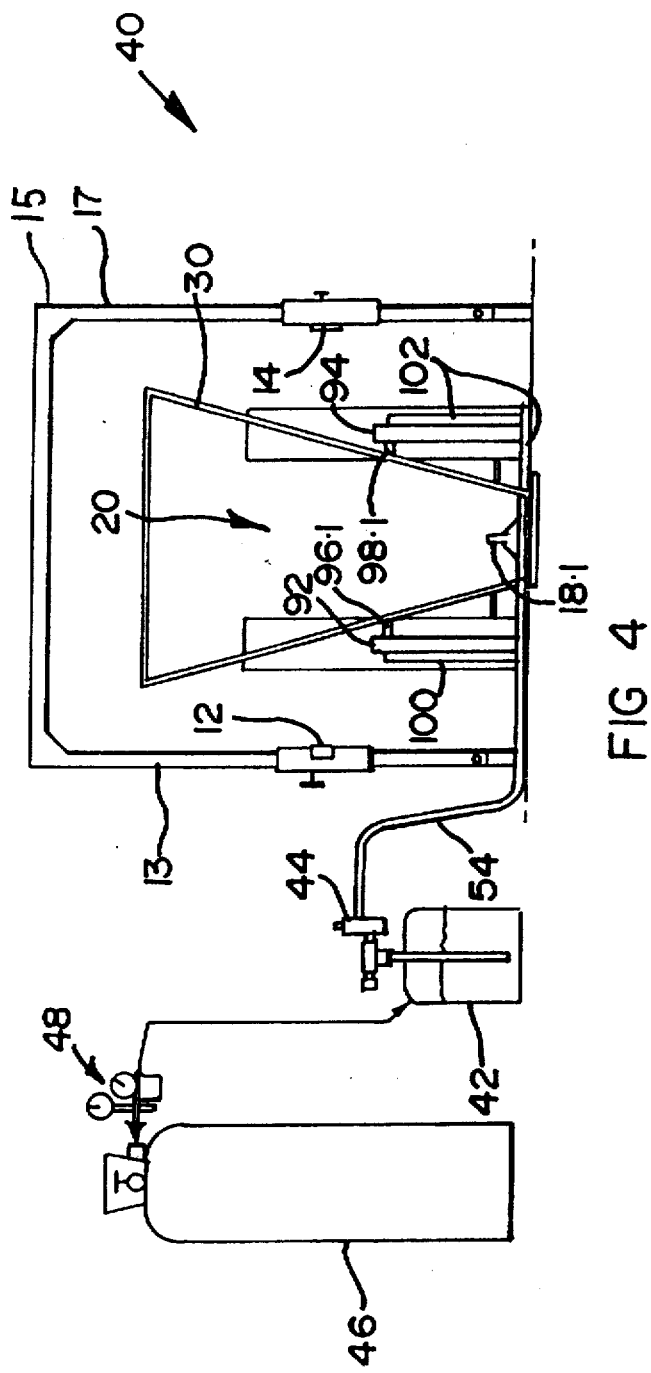
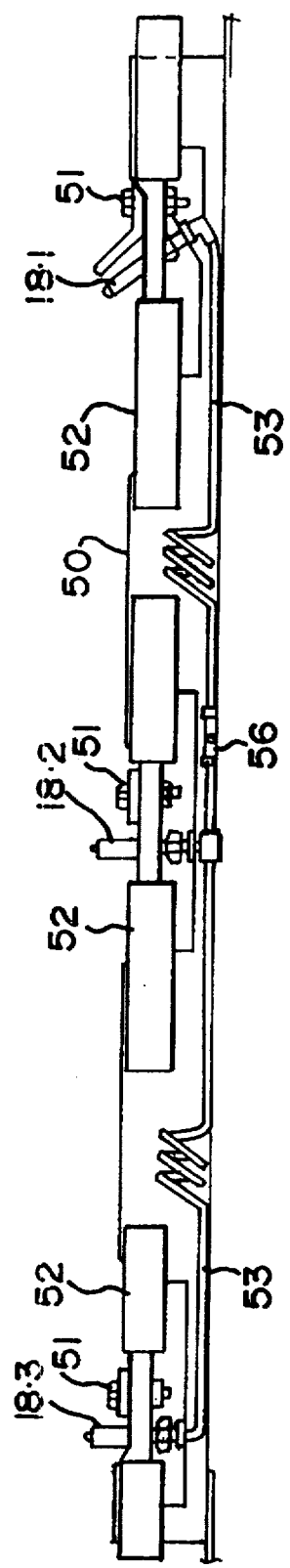
FIG 4
FIG 5

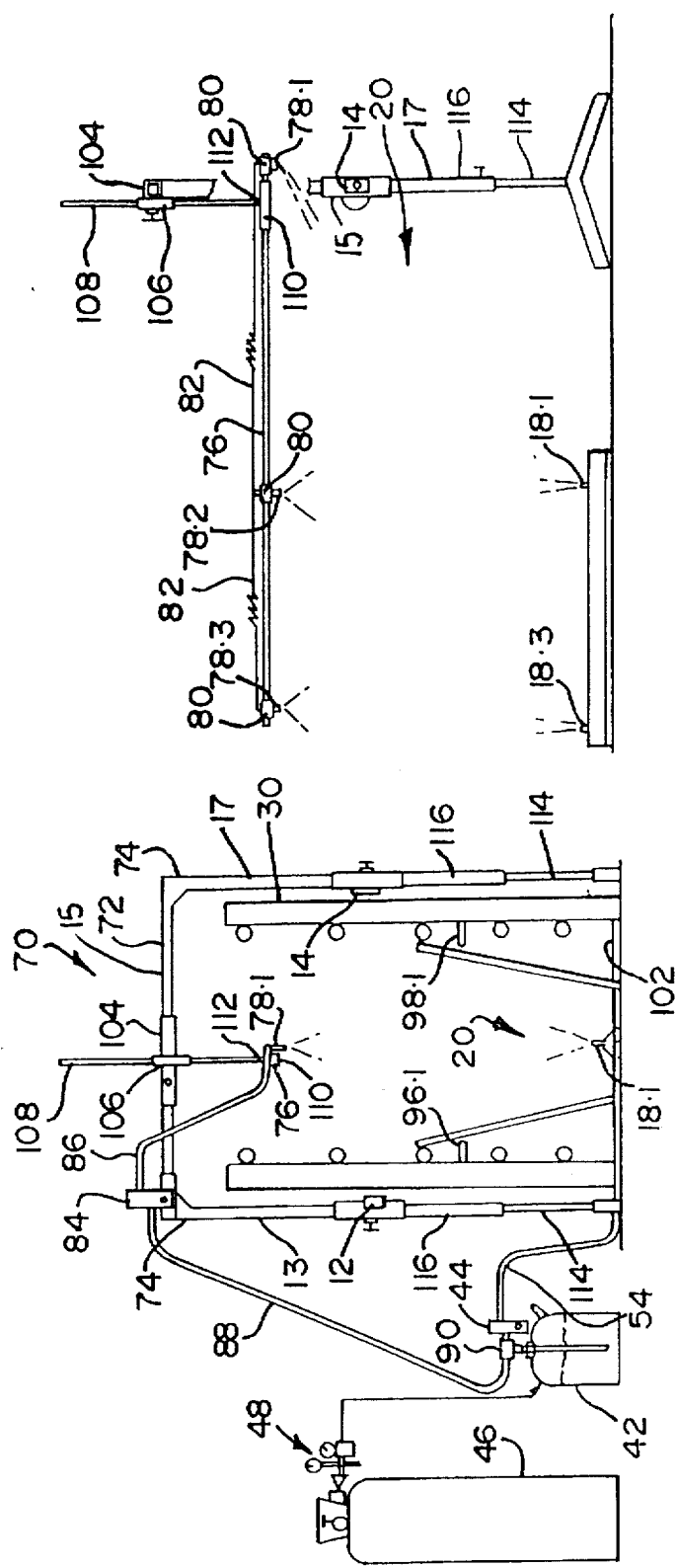
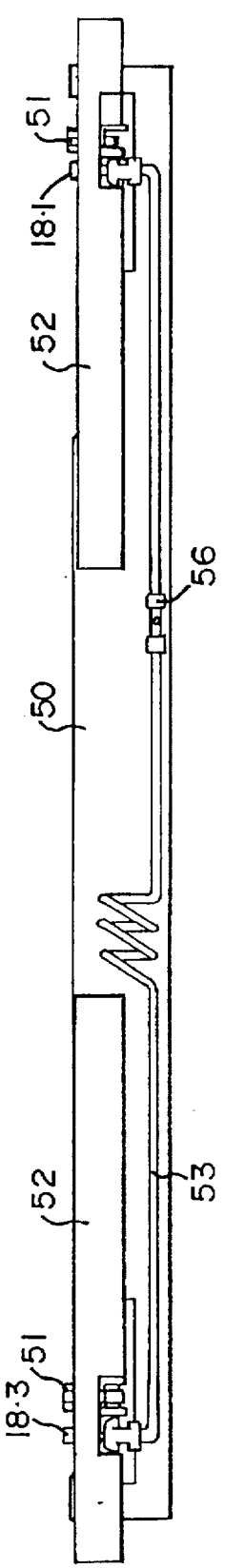
FIG. 8
FIG. 7
FIG. 9

APPLICATION OF A PESTICIDE TO AN ANIMAL

BACKGROUND OF INVENTION

THIS INVENTION relates to the application of a pesticide to an animal. More particularly, the invention relates to an apparatus for applying a pesticide to an animal and to a method of applying a pesticide to an animal.

SUMMARY OF INVENTION

According to a first aspect of the invention, there is provided an apparatus for applying a pesticide to an animal, the apparatus including a detecting means for detecting the presence of the animal within an application zone, the detecting means being capable of generating a suitable signal upon detecting the animal; and an application means for applying pesticide to the animal, the application means being actuable upon receipt of the signal from the detecting means and being suitably oriented with respect to the application zone so that the pesticide is applied to desired regions on the animal, said regions including a region between front legs of the animal.

There would, in most cases, be a large number of animals involved. The apparatus may thus include a crush pen through which the animals may be guided, the application zone being within the crush pen.

The application means may include a number of suitably oriented spray nozzles connected to a supply of pesticide.

The detecting means may be in the form of a light beam emitter and detector arrangement which causes a beam of light to extend across the application zone, between the emitter and the detector, and which produces a signal upon detection of the animal.

The apparatus may include an elongate support member extending operatively upwardly on each side of the application zone. The light beam emitter and detector arrangement may be mounted adjustably on the support members so that a height of the beam of light can be adjusted to suit differently sized animals.

The nozzles may be oriented so that when an animal is detected a spray nozzle is directed towards the region between the front legs, a spray nozzle is directed towards a groin region, and a spray nozzle is directed towards a belly of the animal. The nozzles may be mounted adjustably on a support structure so that the positions of the nozzles are adjustable to suit differently sized animals.

At least one overhead spray nozzle may be directed towards a back of the animal. The, or each, overhead spray nozzle may be adjustably mounted on a boom extending from a cross member arranged between upper ends of the support structure.

At least one lateral spray nozzle may be directed towards each side of the animal. More particularly, at least two spray nozzles may be arranged on each side of the application zone. The spray nozzles on each side of the application zone may be arranged in a substantially horizontal plane or in a plane angularly disposed to a substantially horizontal plane.

The nozzles may be connected to the supply of pesticide via at least one control valve. The apparatus may include an actuator for actuating the, or each, valve, the actuator being operably connected to the detecting means to open the, or each, valve when an animal is detected. The apparatus may further include an electronic timer for governing operation of the, or each, control valve so that a desired amount of pesticide is released through each nozzle, in use.

Instead, said supply of pesticide may be connected to each spray nozzle via a metering device to meter the desired volume to be sprayed through each nozzle.

The apparatus may include a set of guide rails defining an entrance to the application zone and configured so that a direction of movement of the animal is altered prior to the animal entering the application zone to inhibit the animal from moving through the application zone at an excessive speed.

According to a second aspect of the invention, there is provided a method of applying a pesticide to an animal which includes the steps of detecting the presence of the animal within an application zone; and applying the pesticide to the animal, on detecting the animal in the application zone, to desired regions on the animal, said regions including a region between front legs of the animal.

The method may include the step of guiding the animal into a crush pen, said crush pen defining the application zone.

The animal may be detected by setting up a beam of light across the application zone and detecting the breaking of the beam of light. A further animal may be detected only once a further beam of light has been made and the breaking of that beam of light detected. Hence, double dosing of the animal is inhibited.

The method may include the step of orienting a number of spray nozzles in a suitable fashion so that the pesticide is sprayed from the nozzles to impinge on the animal in said desired regions on the animal. In particular, the method may include orienting the nozzles so that at least the groin region, the region between the front legs and a belly of the animal are sprayed with the pesticide. Further, an overhead spray nozzle may be oriented so that a back of the animal is sprayed with the pesticide. Still further, lateral spray nozzles may be oriented so that the sides of the animal are sprayed with the pesticide.

A direction of movement of the animal may be altered prior to guiding the animal into the application zone to inhibit the animal from moving through the crush pen at an excessive speed.

In use, the animal is directed into the crush pen. Within the crush pen, the animal breaks the beam. A signal is then sent to the actuators and the control valves open for a pre-set period of time and a desired amount of pesticide is sprayed onto the animal via each nozzle. When the pesticide strikes the animal, the animal instinctively moves forward and the pesticide thus covers an increased area with beneficial results.

The invention is now described, by way of examples, with reference to the accompanying drawings.

BRIEF DESCRIPTION OF THE DRAWINGS

In the drawings,

FIG. 4 shows a front view of an apparatus, in accordance with a second embodiment of the invention, for applying a pesticide to an animal;

FIG. 5 shows a side view of a part of the apparatus of FIG. 4;

FIG. 7 shows a front view of an apparatus, in accordance with a third embodiment of the invention, for applying a pesticide to an animal;

FIG. 8 shows a side view of part of the apparatus of FIG. 7; and

FIG. 9 shows a side view of another part of the apparatus of FIG. 7.

DETAILED DESCRIPTION OF THE DRAWINGS

Figure 1:
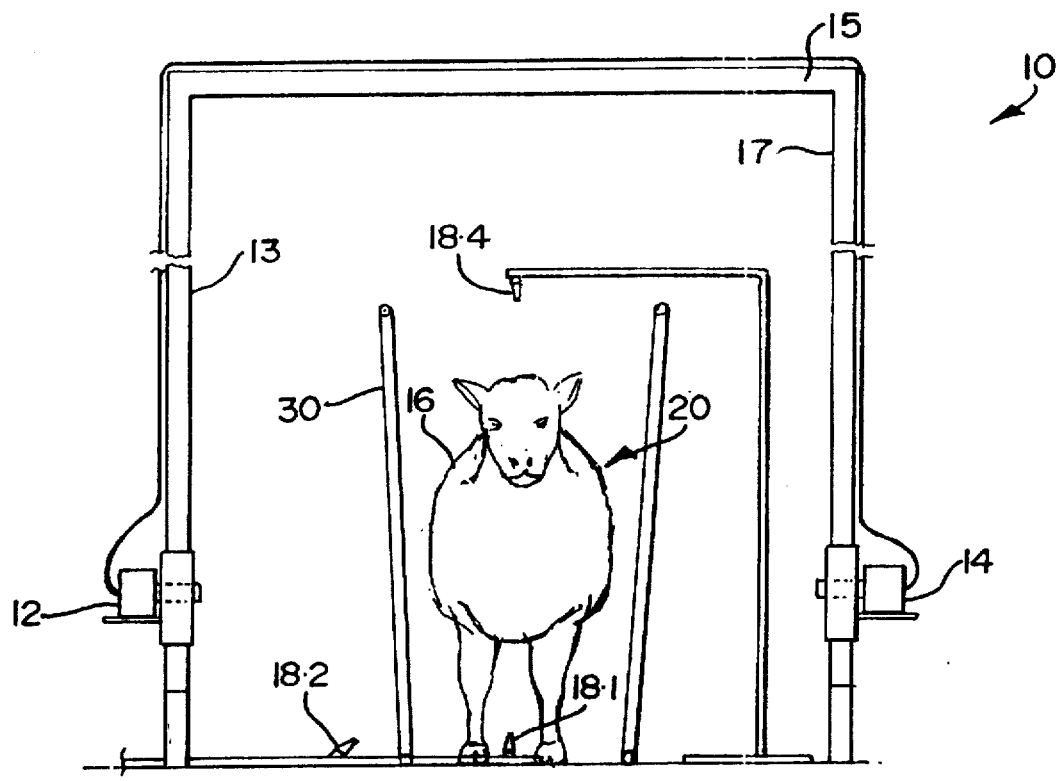
FIG. 1 shows a front view of an apparatus, in accordance with a first embodiment of the invention, for applying a pesticide to an animal.
Figure 2:
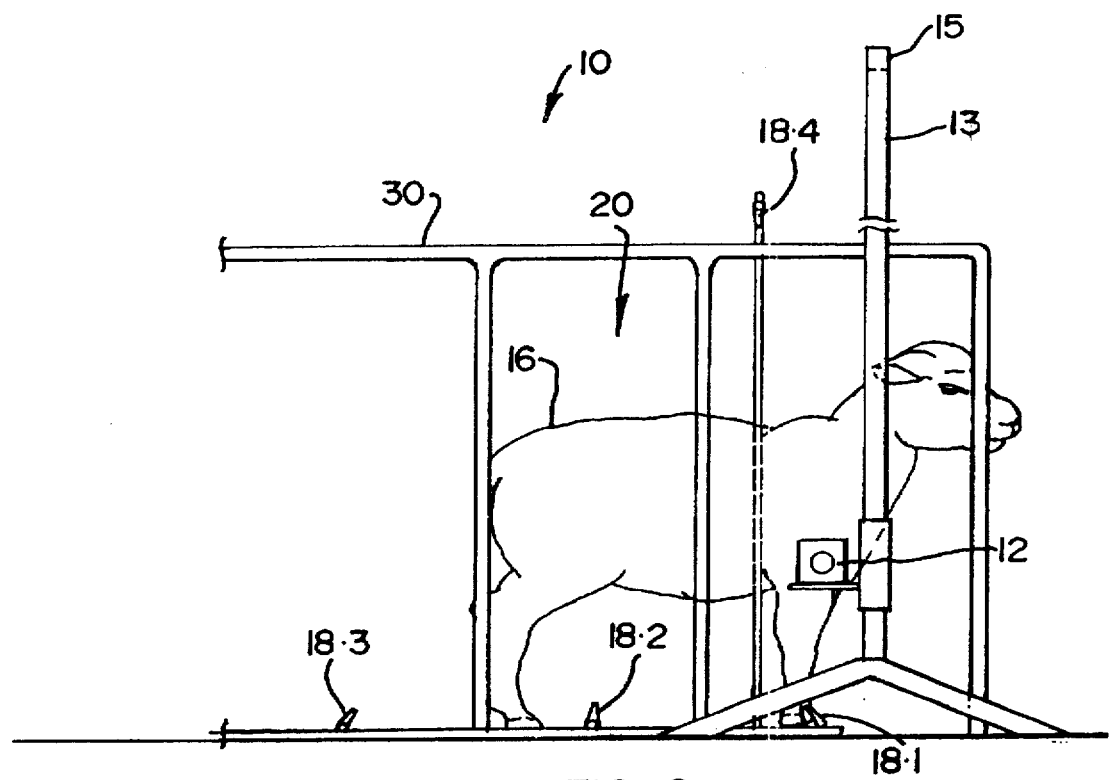
FIG. 2 shows a side view of the apparatus of FIG. 1.
Figure 3:
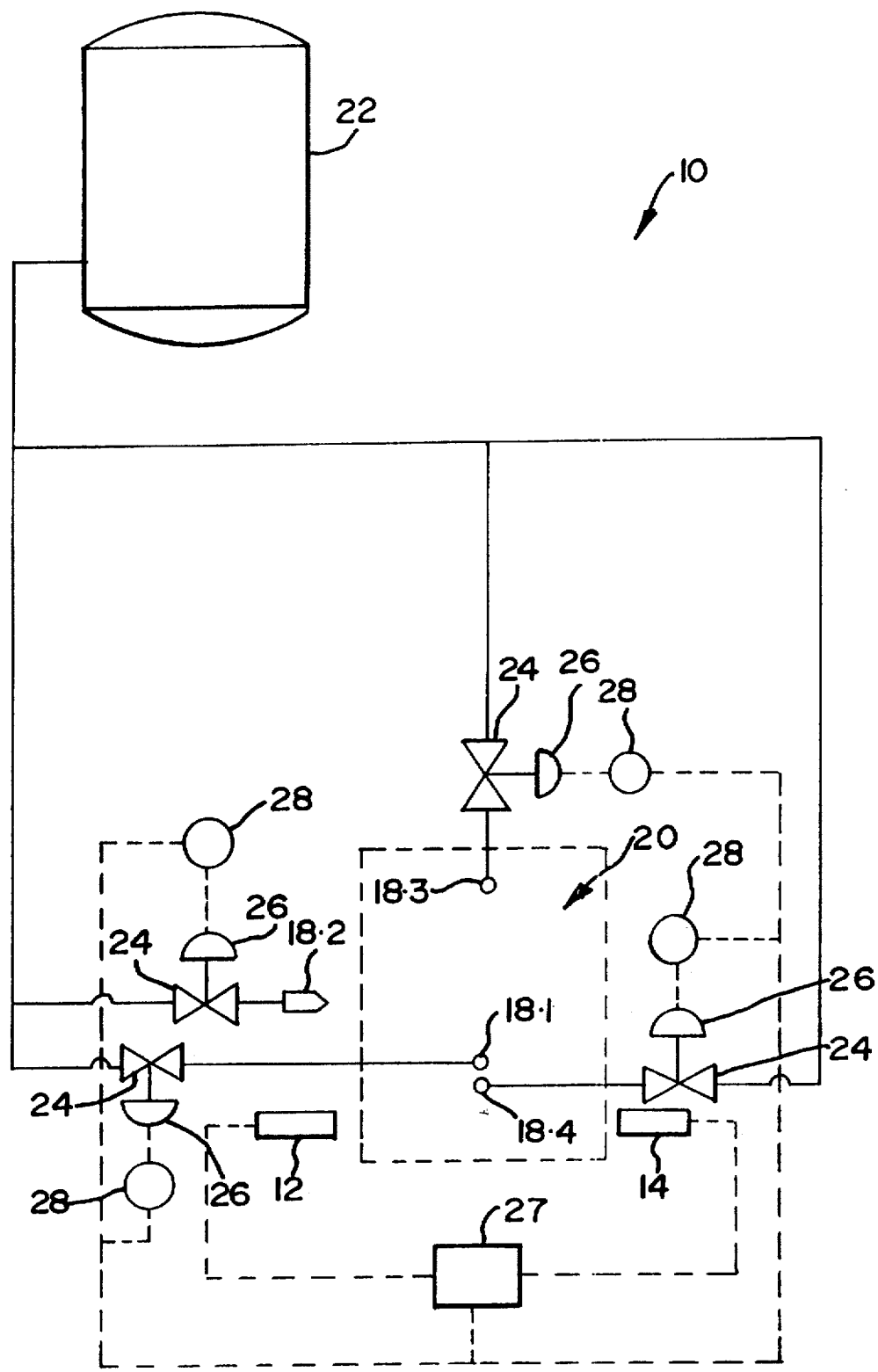
FIG. 3 shows a schematic diagram of the apparatus of FIG. 1.

In FIGS. 1 to 3, reference numeral 10 generally indicates an apparatus, in accordance with a first embodiment of the invention, for applying a pesticide to an animal.

The apparatus 10 includes a detecting means for detecting the presence of an animal 16 within an application zone 20. The detecting means is in the form of a light beam emitter 12 and detector 14 arrangement which produces a signal when a beam of light set up between the emitter 12 and the detector 14 is broken.

An elongate support frame 15 extends upwardly on each side of the application zone 20. The emitter 12 is adjustably mounted on a support member 13 of the frame 15 while the detector 14 is adjustably mounted on an opposed support member 17. Thus, the height of the emitter 12 and the detector 14 can be adjusted to suit differently sized animals.

The apparatus 10 further includes an application means in the form of a number of suitably oriented spray nozzles 18 connected to a pressurised supply 22 (FIG. 3) of pesticide. The nozzles 18, the emitter 12 and the detector 14 are configured so that, when the light beam is broken by the animal 16, the animal 16 is within the application zone 20. When the animal 16 is within the application zone 20, one spray nozzle 18.1 is directed towards a region between the front legs, a spray nozzle 18.2 is directed towards the belly, a spray nozzle 18.3 is directed towards the groin, and a spray nozzle 18.4 is directed towards the back of the animal 16.

Each nozzle 18 is connected to the supply 22 via a control valve in the form of a solenoid valve 24. An actuator 26 for actuating each valve 24 is operably connected to each valve 24. An electronic processing unit 27 is connected between the emitter 12 and the detector 14 to generate said signal when the light beam is broken. Each valve 24 is governed by an electronic timer 28, operably connected between each actuator 26 and the unit 27, to stay open for a predetermined period of time so that a desired amount of pesticide is released through each nozzle 18, in use. It is to be appreciated that the pressure of the supply 22 is sufficient to permit the pesticide to reach the skin of the animal 16.

The unit 27 is such that once the beam is broken and a signal has been sent to each actuator 26, a further signal will only be sent once the beam has been made and again broken. Hence, double dosing of the animal 16 is inhibited.

Each electronic timer 28 is adjustable so that a user can adjust the amount of pesticide dispensed to each of the abovementioned regions of the animal 16.

The apparatus 10 includes a crush pen 30 through which a large number of the animals 16 may be guided in single file, the application zone 20 being within the crush pen 30.

In use, with the apparatus 10, the animal 16 is directed into the crush pen 30. Within the crush pen 30, the animal 16 breaks the beam. A signal is then sent to the unit 27 which generates a suitable signal to be sent to the timers 28. The timers 28 cause the actuators 26 to open the solenoid valves 24 for a preset period of time and thus a desired amount of pesticide is sprayed onto the animal 16 via each nozzle 18.

When the pesticide strikes the animal 16, the animal 16 instinctively moves forward and the pesticide covers an increased area with beneficial results.

In FIG. 4, reference numeral 40 generally indicates an apparatus for applying a pesticide to an animal in accordance with a second embodiment of the invention. With reference to FIGS. 1 to 3, like reference numerals refer to like parts unless otherwise specified.

The apparatus 40 is specially suited for smaller livestock such as sheep.

The apparatus 40 only has the nozzles 18.1, 18.2 and 18.3, the nozzle 18.4 for the back of the animal being omitted.

The pesticide is supplied to the nozzles 18 from a pesticide tank 42 via a single solenoid valve 44 mounted on the tank 42. A compressed air tank 46 is connected to the tank 42 via a suitable pressure gauge and regulator valve arrangement 48.

The nozzles 18.1, 18.2 and 18.3 are mounted on a support structure 50 (FIG. 5). The support structure 50 has three slide members 52 mounted thereon. Each slide member 52 is slidably mounted with respect to the structure 50. Each nozzle 18 is mounted on a slide member 52. Hence, the position of the nozzles 18 can be adjusted to suit differently sized animals. Each slide member 52 can be locked in position via a suitable bolt and nut arrangement 51. The nozzles 18 are connected to one another via lengths of coiled hose 53 to accommodate movement of the nozzles 18 relative to one another. A length of pipe 54 is connected at one end to one of the lengths of hose 53 via a coupling member 56. The other end of the pipe 54 is connected to the solenoid valve 44.

The apparatus 40 includes further support structures 92, 94 arranged on opposed sides of the application zone 20. The support structures 92, 94 each have three horizontally spaced nozzles 96, 98, respectively, arranged thereon. The support structures 92, 94 are such that the nozzles 96 are directed towards one side of the animal while the nozzles 98 are directed towards the other side of the animal. Further, the nozzles 96 and the nozzles 98 lie in a horizontal plane.

Figure 6:
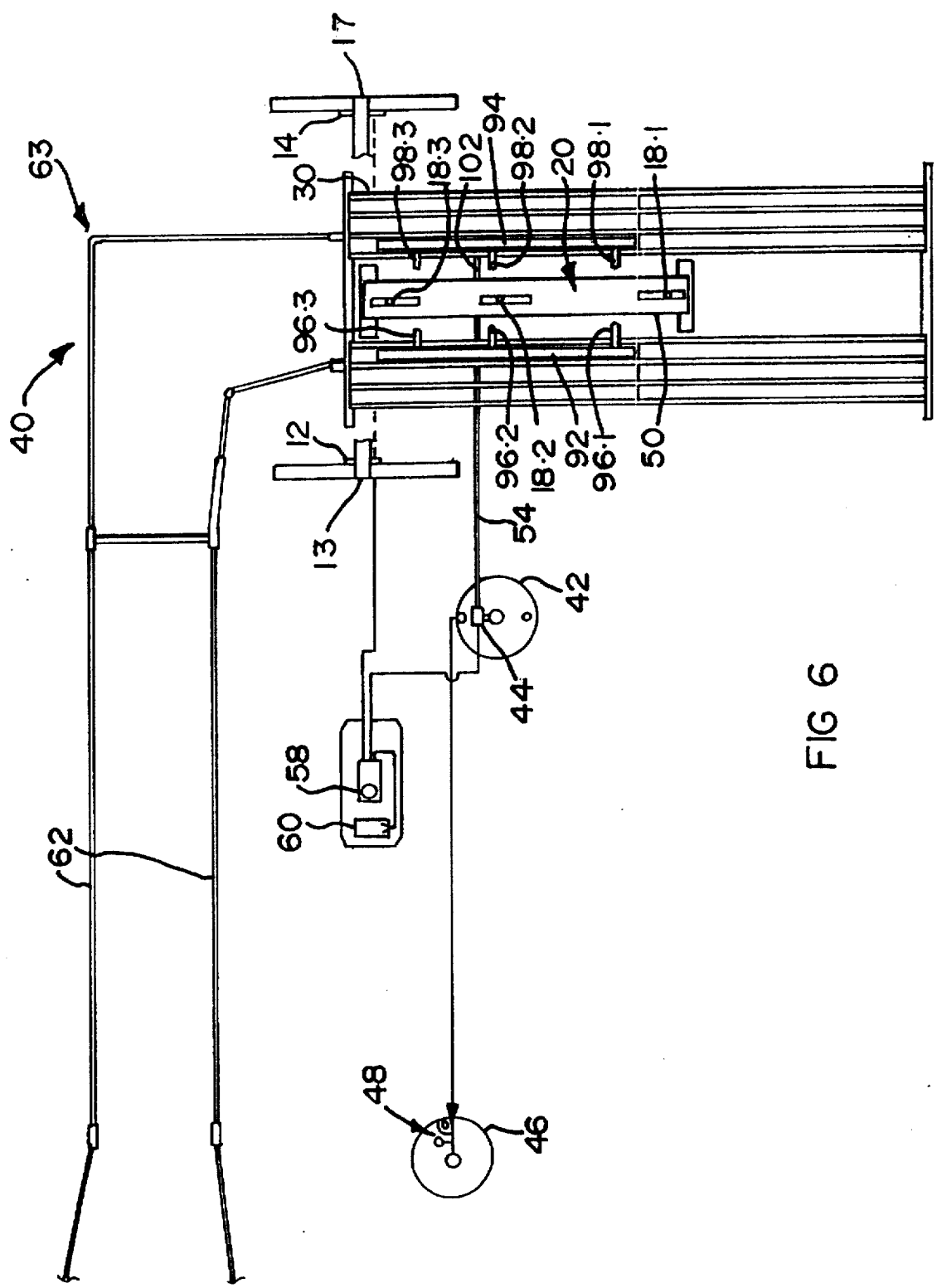
FIG. 6 shows a plan view of the apparatus of FIG. 4.

As can be seen in FIG. 6, nozzles 96.1, 98.1 are directed towards the front of the animal, nozzles 96.2, 98.2 are directed towards the middle of the animal and nozzles 96.3, 98.3 are directed towards the rear of the animal. The nozzles 96 are connected to the pipe 54 via a supply pipe 100. Similarly, the nozzles 98 are connected to the pipe 54 via a further supply pipe 102.

The light beam emitter 12 and detector 14 arrangement is connected to an electronic control device 58 (FIG. 6) which in turn is connected to the solenoid valve 44. In use, when the beam of light is broken, the device 58 actuates the valve 44 and keeps the valve 44 open for a predetermined period of time so that a desired amount of pesticide is released through each nozzle 18, 96, 98. A rechargeable battery 60 is connected to the device 58 to power the device 58.

The crush pen 30 includes a set of guide rails 62 (FIG. 6) which define an entrance to the application zone 20. The guide rails 62 are configured to form a substantially right-angled bend 63 to inhibit the animal from moving through the application zone 20 at an excessive speed.

In FIG. 7, reference numeral 70 generally indicates an apparatus for applying pesticide to an animal according to a third embodiment of the invention. With reference to FIGS. 1 to 6, like reference numerals refer to like parts unless otherwise specified.

The apparatus 70 is particularly suited for larger livestock such as cattle.

Instead of having three nozzles 18 arranged on the support structure 50, the apparatus 70 has the two nozzles 18.1 and 18.3, arranged on the support structure 50 with each of the nozzles 18.1 and 18.3 being fixed to a slide member 52. Hence, in use, the pesticide is sprayed towards the region between the front legs and the groin region of, for example, a cow.

The apparatus 70 has a cross member 72 arranged between upper ends 74 of the support frame 15.

A first sleeve 104 is slidably mounted on the cross member 72. A second, vertically oriented sleeve 106 is fastened to the first sleeve 104. A rod 108 is slidably mounted within the second sleeve 106. A third sleeve 110 is fastened to a lower end 112 of the rod 108. The third sleeve 110 is oriented horizontally and at right angles to the cross member 72. A boom 76 is slidably mounted within the third sleeve 110 and extends over the application zone 20. Each support member 13, 17 includes a first elongate element 114 telescopically arranged within a second, tubular element 116. The elements 114, 116 are adjustable with respect to each other. It is thus to be appreciated that the vertical position of the boom 76 can be adjusted with respect to the application zone 20. Three overhead spray nozzles 78 are adjustably mounted, via slides 80 on the boom 76. The position of the nozzles 78 can thus be adjusted to accommodate differently sized animals.

One of the spray nozzles 78.1 is directed toward the neck of the animal, one of the spray nozzles 78.2 is directed to a central region on the back of the animal and the remaining nozzle 78.3 is directed to a rear region on the back of the animal. The nozzles 78 are connected to one another via lengths of coiled hose 82.

A solenoid valve 84 is mounted on the cross member 72. A further length of coiled hose 86 connects the valve 84 to one of the lengths of coiled hose 82. A hose 88 is connected to an outlet of a T-piece 90 mounted on the pesticide tank 42. The solenoid valve 44 is also connected to the T-piece 90 via another outlet of the T-piece 90.

As with the solenoid valve 44, the solenoid valve 84 is connected to an electronic control device (not shown) which in turn is connected to the light emitter 12 and detector 14 arrangement. The device actuates the valve 84 when the beam of light is broken and keeps the valve 84 open for a predetermined period of time so that a desired amount of pesticide is released through each nozzle 78.

The Applicant believes that this invention provides a means whereby pesticide, of suitable strength to last a reasonable amount of time, may be applied to animals. In particular, the apparatus 10, 40, 70 may be utilised with "pour on" pesticides which are more potent and longer lasting than pesticides used in dips and sprays. The apparatus 10, 40, 70 facilitates application of the pesticide to the skin of the animal in those regions where conventionally applied "pour on" pesticides do not reach or reach at a lower degree of efficacy. This results in the inhibition of the re-manifestation of pests, in particular, ticks, in regions such as between the front legs and the groin of the animal.

The Applicant further believes that the apparatus 10, 40 is particularly advantageous when utilised with sheep. In sheep, with conventional application methods, the pesticide tends to mix with and be dispersed by wool oil so that the efficacy of the pesticide is greatly reduced by the time the pesticide reaches the skin of the sheep. With the apparatus 10, 40 the pesticide is sprayed directly onto the desired areas with sufficient pressure to enable the pesticide to reach the skin without much reduction in its efficacy.

Further, to apply the "pour on" pesticide in the desired areas manually, presents major logistical difficulties especially where large numbers of animals are involved. With the apparatus 10, 40, 70 all that need be done is to guide the animals through the crush pen 30.

The difficulties mentioned above are compounded when the animals are large and thus awkward to handle. The apparatus 70 is particularly useful for large animals and serves to alleviate these difficulties since the pesticide can be automatically applied to desired regions on the animal.

Manual application of the pesticide to animals, which is presently carried out with "pour on" pesticides, is a relatively slow and labour intensive process. Further, the "pour on" pesticides are often inaccurately applied leading to an uneven spread of pesticide and sub-lethal doses in those areas in which the parasites tend to re-manifest themselves. With the apparatus 10, 40, 70, a higher level of accuracy can be obtained with the result that the pesticide retains its efficacy for a longer period of time than if the pesticide was applied manually.

I claim:

1. An apparatus for applying a pesticide to an animal, the apparatus including:

a detecting means for detecting the presence of the animal within an application zone, the detecting means comprising an emitter and a detector situated on a pen means for generating a suitable signal upon sensing the animal;

said pen means for defining the application zone and for limiting movement of the animal, the detecting means being arranged in the pen means so that, with a front portion of the animal positioned in the pen means between the emitter and the detector, a region between the front legs and a belly or groin region of the animal are positioned within the application zone; and an application means for applying pesticide to the animal in the application zone, the application means being actuated upon receipt of the signal from the detecting means, the application means comprising a plurality of nozzles positioned about said pen means applying pesticide to at least the region between the front legs and the belly or groin of the animal with the front portion of the animal positioned between the emitter and the detector, at least one of the nozzles being arranged in a path of the animal through the pen means and being oriented so that the pesticide is sprayed upwardly to impinge on the region between the front legs of the animal.

2. The apparatus as claimed in claim 1, in which the the emitter and detector is in the form of a light beam emitter and detector arrangement which causes a beam of light to extend across the application zone, between the emitter and the detector and which produces a signal upon detection of the animal.

3. The apparatus as claimed in claim 2, which includes an elongate support member extending operatively upwardly on each side of the application zone.

4. The apparatus as claimed in claim 3, in which the light beam emitter and detector arrangement is mounted adjustably on the support members so, that a height of the beam of light can be adjusted to suit differently sized animals.

5. The apparatus as claimed in claim 1, in which the nozzles are oriented so that when an animal is detected a spray nozzle is directed towards the region between the front legs, a spray nozzle is directed towards a groin region, and a spray nozzle is directed towards a belly of the animal.

6. The apparatus as claimed in claim 5, in which the nozzles are mounted adjustably on a support structure so that the positions of the nozzles are adjustable to suit differently sized animals.

7. The apparatus as claimed in claim 6, in which at least one overhead spray nozzle is directed towards a back of the animal.

8. The apparatus as claimed in claim 7, in which the, or each, overhead spray nozzle is adjustably mounted on a boom extending from a cross member arranged between upper ends of the support structure.

9. The apparatus as claimed in claim 6, in which at least one lateral spray nozzle is directed towards each side of the animal.

10. The apparatus as claimed in claim 9, in which at least two lateral spray nozzles are arranged on each side of the application zone, the spray nozzles being arranged in a substantially horizontal plane.

11. The apparatus as claimed in claim 9, in which at least two lateral spray nozzles are arranged on each side of the application zone, the spray nozzles being arranged in a plane angularly disposed to a substantially horizontal plane.

12. The apparatus as claimed in claim 1, in which the nozzles are connected to the supply of pesticide via at least one control valve.

13. The apparatus as claimed in claim 12, which includes an actuator for actuating the, or each, valve, the actuator being operably connected to the detecting means to open the, or each, valve when an animal is detected.

14. The apparatus as claimed in claim 13, which includes an electronic timer for governing operation of the, or each, control valve so that a desired amount of pesticide is released through each nozzle, in use.

15. The apparatus as claimed in claim 1, which includes a set of guide rails defining an entrance to the application zone and configured so that a direction of movement of the animal is altered prior to the animal entering the application zone to inhibit the animal from moving through the application zone at an excessive speed.

16. A method of applying a pesticide to an animal which includes the steps of causing the animal to pass through a pen which defines an application zone and which limits movement of the animal such that a detection of a first portion of the animal in the application zone indicates that a region between the front legs and a belly or groin region of the animal are also in the application zone;

detecting the presence of the first portion of the animal within the application zone and generating a suitable signal to indicate that the region between the front legs and the belly or groin region of the animal are in the application zone;

receiving the signal and actuating a plurality of nozzles positioned in the application zone to cause them to apply pesticide to the animal in the application zone, the nozzles being oriented so that the pesticide is applied to at least the region between the front legs and the belly or groin region of the animal upon receipt of the signal, at least one of the nozzles being arranged in a path of the animal through the pen and being oriented so that the pesticide is sprayed upwardly to impinge on the region between the front legs of the animal.

17. The method as claimed in claim 16, which includes detecting the animal by setting up a beam of light across the application zone and detecting the breaking of the beam of light.

18. The method as claimed in claim 17, which includes detecting a further animal only once a further beam of light has been made and the breaking of that beam of light detected.

19. The method as claimed in claim 16, which includes orienting an overhead spray nozzle so that a back of the animal is sprayed with the pesticide.

20. The method as claimed in claim 16, which includes orienting lateral spray nozzles so that the sides of the animal are sprayed with the pesticide.

21. The method as claimed in claim 16, which includes the step of altering a direction of movement of the animal prior to guiding the animal into the application zone to inhibit the animal from moving through the application zone at an excessive speed.

* * * * *